Oct. 13, 1959 C. J. HARRIS 2,908,846
ELECTRICAL TEST SYSTEM
Filed Oct. 23, 1957

*INVENTOR.*
CLARENCE J. HARRIS
BY W. E. Thibodeau, T. J. Lynch and H. R. Johns

United States Patent Office 2,908,846

Patented Oct. 13, 1959

2,908,846

ELECTRICAL TEST SYSTEM

Clarence J. Harris, Philadelphia, Pa.

Application October 23, 1957, Serial No. 692,011

7 Claims. (Cl. 315—230)

(Granted under Title 35, U.S. Code (1952), sec. 266)

The invention described herein may be manufactured and used by or for the Government for governmental purposes without the payment of any royalty thereon.

This invention relates to electrical systems for use in testing various types of devices. More particularly it may include means for producing a control voltage of hyperbolic increasing amplitude and a gating means adapted to pass a signal when this amplitude of the control voltage reaches a predetermined value.

In the illustrated form of the invention, a variable Mu tube, such as a 6SK7 or a 6SJ7, has connected to its input circuit a trapezoidal wave circuit. A switch is so connected to this trapezoidal wave circuit that it may be closed for biasing the variable Mu tube to cut off and opened for imparting a hyperbolic increasing amplitude at the output of the variable Mu tube to a signal applied to the input circuit of the tube.

The output of this variable Mu tube may be applied to the input of a tetrode which has connected in its plate and screen grid circuits resistors so related in value that current is passed to a load circuit only when the signal of hyperbolic increasing amplitude reaches a predetermined value of amplitude. When this value is reached, signal is passed to the load input circuit. Energization of the load circuit thus follows closure of the trapezoidal wave circuit switch by a predetermined number of cycles. This number of cycles is predetermined by the constants of the trapezoidal wave circuit and the constants of the gating circuit and may be made to have different desired values.

While the invention will be described as utilized in a gating system, it will be understood that the means for generating the signal of hyperbolic increasing amplitude is not limited to such gating circuits but is susceptible of other applications.

The invention will be better understood from the following description considered in connection with the accompanying drawings and its scope will appear from the appended claims.

Referring to the drawings.

Figure 1:
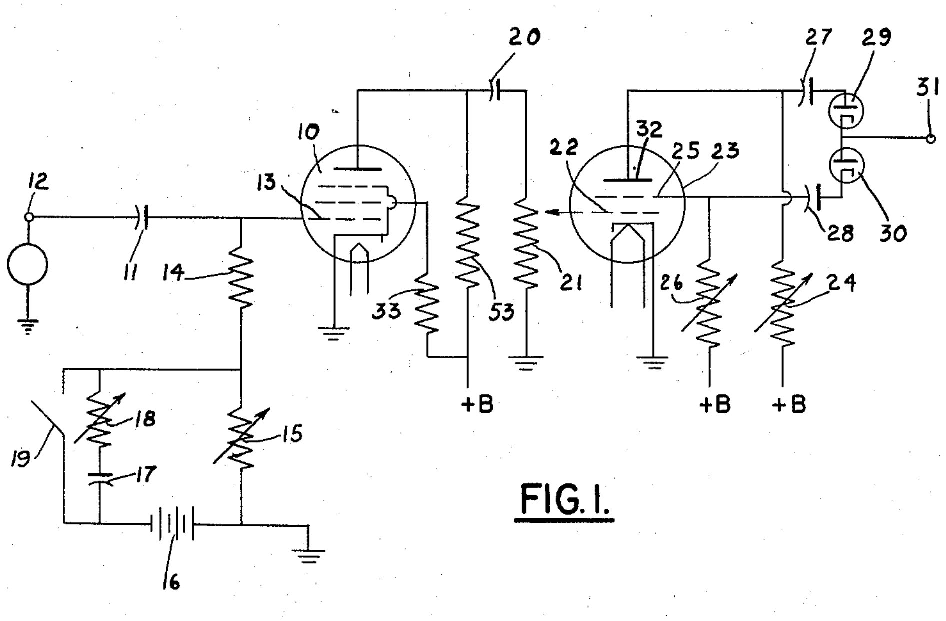
Fig. 1 is a circuit diagram of the system.

Fig. 1 shows a one stage amplifying tube 10 which is of the variable Mu type and has connected in its input circuit a capacitor 11 through which an audio or other signal may be applied from a terminal 12 to the grid 13.

Also connected to the grid 13 is a resistor 14 and a trapezoidal wave circuit which includes a resistor 15, a grid bias battery 16, a capacitor 17, a resistor 18 and a switch 19.

In explaining the operation of the amplifier 10 it is first assumed that the battery 16 provides a bias voltage of E volts. A signal is applied to the terminal 12 and the switch 19 is closed. Under these conditions, the lower terminal of the resistor 15 is at ground potential, the upper terminal of resistor 15 is at E volts and the tube 10 is biased to cut off.

When the switch 19 is opened, however, the grid 13 becomes more positive and, due to the *ip* vs. *eg* (transconductance) relationships of the variable Mu tube 10, an output signal of a hyperbolic increasing amplitude is obtained at the output of tube 10, the rate of build up and the signal shaping being determined by the constants trapezoidal wave circuit 15—16—17—18—19.

Output voltage from the amplifier 10 is applied through capacitor 20 and resistor 21 to the control grid 22 of a gating tube 23 of tetrode type. This tube has in its plate circuit a resistor 24 and in the circuit of its screen grid 25 a resistor 26.

Figure 2:
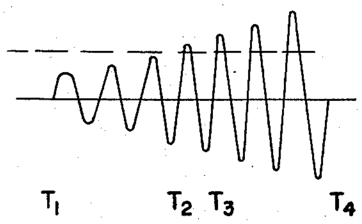
Fig. 2 illustrates the input voltage applied to a gating tube in response to opening of the switch connected to the trapezoidal wave circuit.

These resistors 24 and 26 are so related in value that the voltage at the screen grid 25 exceeds that at the plate 32 under static conditions, conduction of the tube 10 being interrupted. With input signals to grid 22 of relatively low amplitude, such as those during the time $T_1$—$T_2$ of Fig. 2, this relation between the plate and screen grid voltages of gate tube 23 is maintained. At higher signal voltages, such as those during the time $T_3$—$T_4$ of Fig. 2, there is reached a point at which the plate voltage of the gate tube 23 exceeds that of its screen grid 25. At this point, the potential applied through capacitors 27 and 28 to the diodes 29 and 30 is reversed and voltage appears at the output terminal 31.

Figure 4:
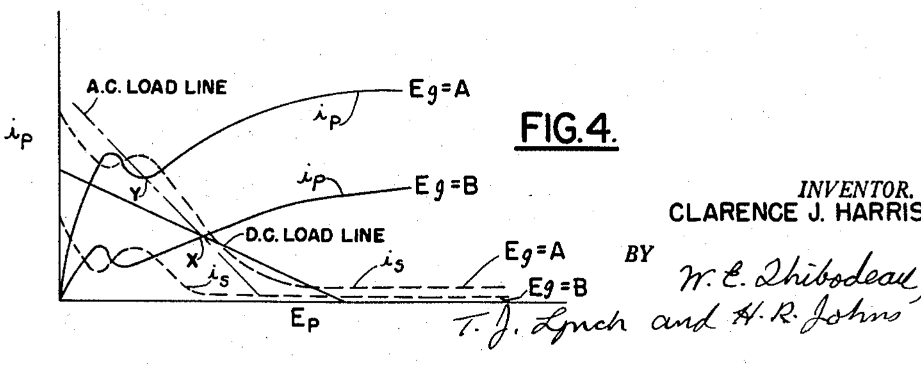
Fig. 4 is an explanatory diagram relating to the operations of the gating element of the system.

Operation of the gating part of the system is based on the tetrode characteristics (*ip* vs. *ep*) illustrated by Fig. 4.

Figure 3:
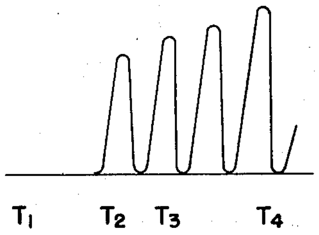
Fig. 3 illustrates the output voltage produced at the load input circuit.

Here the circuit is designed for quiescent operation at the point *x* and has an audio signal applied to its input. At small signal amplitudes, the voltage at the screen exceeds that at the screen under static conditions. At small input signal voltages such as $Fg=B$ this relation is maintained. At higher signal amplitudes such as $Eg=A$, however, the point Y is finally reached on the A.C. load line so that the screen grid current exceeds the plate current *ip*. This makes the plate voltage higher than that of the screen grid and starts conduction through the diodes 29 and 30 which have acted as an open circuit up to this point. With the diodes 29 and 30 conducting, a signal appears at the load input terminal 31 as indicated by Fig. 3.

As previously indicated, the values of the resistors 24 and 26 determine the difference between the plate and screen grid voltages of the gating tube 23 under static conditions. This relationship determines the amplitude of input signal necessary to bring the diodes 29 and 30 into operation. This amplitude, of course, is dependent on the adjustment of grid resistor 21 and the value of plate resistor 53 and the screen grid resistor 33 of amplifier 10.

I claim:

1. The combination of an electron discharge device having input and output circuits, means for applying a signal to said input circuit, means connected in said input circuit for imparting to said signal a hyperbolic increasing amplitude, a load input circuit, and means for excluding from said load input circuit a predetermined number of the cycles of said hyperbolic increasing amplitude signal.

2. The combination of an electron discharge device having input and output circuits, means for applying a signal to said input circuit, a trapezoidal wave circuit including a source of bias potential interconnected with a resistor and a capacitor, and a switch operable to one position for shunting said capacitor and said resistor to apply a cut off potential to said input circuit and to another position for imparting to said input signal a hyperbolic increasing amplitude.

3. The combination of an electron discharge device having input and output circuits, means for applying a signal to said input circuit, a trapezoidal wave circuit including a source of bias potential interconnected with a resistor and a capacitor, a load input circuit, and means for admitting to said load input circuit only such cycles of said hyperbolic increasing amplitude as have an amplitude exceeding a predetermined level.

4. The combination of an electron discharge device having input and output circuits, means for applying a signal to said input circuit, a trapezoidal wave circuit including a source of bias potential interconnected with a resistor and a capacitor, a tetrode having an input circuit coupled to the output circuit of said electron discharge device and having connected in its plate and screen grid circuits resistors so related in value that its plate voltage exceeds that of its screen grid at a predetermined value of said hyperbolic increasing amplitude, and means for applying signal to a load input circuit in response to said change in the relation between said plate and screen grid voltages.

5. The combination of an electron discharge device having input and output circuits, means for applying a signal to said input circuit, a trapezoidal wave circuit including a source of bias potential interconnected with a resistor and a capacitor, a tetrode having an input circuit coupled to the output circuit of said electron discharge device and having connected in its plate and screen grid circuits resistors so related in value that its plate voltage exceeds that of its screen grid at a predetermined value of said hyperbolic increasing amplitude, and means including a pair of series-connected diodes connected respectively to said plate and said screen grid for applying signal to a load circuit.

6. Gating means including a tetrode having input, plate and screen grid circuits, a first resistor connected in the circuit of said plate, and a second resistor connected in the circuit of said screen grid, the values of said resistors being such that the voltage of said plate exceeds that at said screen grid only when the amplitude of a signal applied to said input circuit exceeds a predetermined value.

7. Gating means including a tetrode having input, plate and screen grid circuits, a first resistor connected in the circuit of said plate, a second resistor connected in the circuit of said screen grid, the values of said resistors being such that the voltage of said plate exceeds that at said screen grid only when the amplitude of a signal applied to said input circuit exceeds a predetermined value, and a pair of series connected diodes coupled respectively to said plate and to said screen grid for applying signal to a load input circuit.

References Cited in the file of this patent

UNITED STATES PATENTS

| | | |
|---|---|---|
| 2,473,237 | Bevins | June 14, 1949 |
| 2,556,614 | Desch | June 12, 1951 |
| 2,642,552 | Sager | June 16, 1953 |
| 2,749,481 | Klein | June 5, 1956 |